No. 679,833. Patented Aug. 6, 1901.
J. T. COWLEY.
APPARATUS FOR BALING FIBROUS MATERIAL.
(Application filed Nov. 30, 1900.)
(No Model.) 4 Sheets—Sheet 1.

No. 679,833. Patented Aug. 6, 1901.
J. T. COWLEY.
APPARATUS FOR BALING FIBROUS MATERIAL.
(Application filed Nov. 30, 1900.)
(No Model.) 4 Sheets—Sheet 2.

Witnesses. Inventor
James T. Cowley
by Brown & Darby attys

No. 679,833. Patented Aug. 6, 1901.
J. T. COWLEY.
APPARATUS FOR BALING FIBROUS MATERIAL.
(Application filed Nov. 30, 1900.)

(No Model.) 4 Sheets—Sheet 3.

Witnesses
Inventor
James T. Cowley
by Mason & Darby attys

No. 679,833. Patented Aug. 6, 1901.
J. T. COWLEY.
APPARATUS FOR BALING FIBROUS MATERIAL.
(Application filed Nov. 30, 1900.)
(No Model.) 4 Sheets—Sheet 4.

Witnesses.

Inventor
James T. Cowley
by Brown & Darby
atty's

UNITED STATES PATENT OFFICE.

JAMES T. COWLEY, OF LOWELL, MASSACHUSETTS, ASSIGNOR TO PLANTERS COMPRESS COMPANY, OF BOSTON, MASSACHUSETTS.

APPARATUS FOR BALING FIBROUS MATERIAL.

SPECIFICATION forming part of Letters Patent No. 679,833, dated August 6, 1901.

Application filed November 30, 1900. Serial No. 38,074. (No model.)

*To all whom it may concern:*

Be it known that I, JAMES T. COWLEY, a citizen of the United States, residing at Lowell, in the county of Middlesex and State of Massachusetts, have invented a new and useful Apparatus for Baling Fibrous Material, of which the following is a specification.

This invention relates to apparatus for baling fibrous material.

The object of the invention is to provide means for baling fibrous materials, and especially fibrous materials having a long fiber or having long stems or stalks—such as sisal, hemp, jute, and the like—wherein the strands, stems, stalks, or fibers are laid into the bale in a parallel condition.

A further object of the invention is to provide a machine for baling long fibrous material in layers of high density wherein the stems, stalks, or the like of each layer will occupy substantially parallel relation with respect to each other, one end of such fiber, stem, stalk, or the like being located at or near the center of the bale and the other end terminating at or near the outer periphery of the bale, each stem, strand, fiber, or the like forming a long curve.

A further object of the invention is to provide a machine which is simple and efficient for properly presenting the material to the compressing apparatus in a manner which will permit the baling of the material in the manner above set forth.

Other objects of the invention will appear more fully hereinafter.

The invention consists, substantially, in the construction, combination, location, and arrangement, all as will be more fully hereinafter set forth, as shown in the accompanying drawings, and finally pointed out in the appended claims.

In Patent No. 630,369, issued August 8, 1899, to George A. Lowry, is shown, described, and claimed a construction of compressing apparatus for fibrous or other material wherein is employed a compression-chamber open at both ends and a slotted cap-plate for one end of said chamber, said cap-plate and chamber being mounted for relative movement. In a machine embodying these generic principles fibrous or other material when presented to the slot or slots in the head or cap plate will be engaged by the material previously introduced to the chamber or will be gripped between the surface of such previously-introduced material which bulges up into the slot and the coöperating or adjacent surface of the lip of the slot and by reason of the relative movement imparted to the chamber and head-plate or cap will be drawn into the chamber in the form of thin flat layers or sheets, each layer or sheet having the air excluded therefrom while being drawn into the chamber, and therefore being superposed spirally upon the previously-introduced mass in a highly condensed and compressed condition. The present invention relates to a machine or compressing apparatus of this type. I have found, however, that in the case of fibrous material having a long fiber or having stems, stalks, or the like—such, for instance, as sisal, hemp, jute, &c.—it is advantageous and desirable that the fibers, stems, stalks, or the like be maintained in straight or parallel relation and prevented from interlacing or tangling and also that they be laid into the bale smoothly, so as not to become tangled, whereby when the bale is opened the material may be removed from the bale in an expeditious manner. In order to accomplish these advantageous results, I propose to employ a feeding mechanism for presenting the material to the compressing apparatus in such manner as to enable the stem, stalks, fibers, or the like of the material to be compressed to be drawn into the compressing-chamber in smooth and untangled relation, one end of each stem, strand, stalk, or the like being located at or near the center of the bale and the other end at or near the periphery thereof, each stalk, stem, strand, or fiber extending in a long spiral or curve and parallel with the other stems, stalks, strands, or fibers of the same layer.

In carrying out my invention I provide means for feeding the material to be compressed in inclined position relative to the plane of relative movement of the slotted head-plate or cap and compression-chamber—that is to say, I provide a carrier which travels in a path or plane which is inclined relative to the plane of the head-plate or cap when the compressing apparatus is in such relation to the feed slot or opening in the head-plate that the material will be drawn from the carrier into the chamber in a line which is transverse to the line of movement of the carrier—and in order to permit the material to be properly drawn into and through the slot in the head-plate as the material progresses therealong I provide the feed-slot with an overhanging lip at the far side of the slot with reference to the point of entry of the material, and I make the slot somewhat wider at the point of entry of the material than at the farther end thereof. For instance, where the material enters at or adjacent to the center of the bale the slot is widest at that point and is narrower toward the outer end of the slot, so that as the carrier advances or progresses the material along the slot such material will be drawn into the chamber in the form of spiral curves, as will be clearly understood.

It is obvious that many different constructions of apparatus may be adapted for carrying the principles of my invention into practical operation. I have shown in the accompanying drawings as illustrative of an operative embodiment of means for this purpose a construction which has been found well adapted for the purposes.

Referring to the accompanying drawings and to the various views and reference-signs appearing thereon.

The same part is designated by the same reference-sign wherever it occurs throughout the several views.

Reference-sign A designates a framework arranged and adapted to support the various parts of the machine. This framework is supported upon and secured to the head-plate ring $A'$ by means of blocks $a'$ and bolts $a$ or in any other suitable or convenient manner.

$A^2$ designates the head-plate, and $A^3$ the compression-chamber.

Except in the particulars hereinafter noted in respect of the construction of the slot or slots in the head-plate, the construction of the head-plate ring, head-plate, and compression-chamber and the means for supporting and operating the same may be substantially the same as set forth in the patent to Lowry, above referred to. In the particular form shown the head-plate is held stationary, and the compression-chamber is designed to be axially rotated.

Associated with each slot L of the head-plate is a carrier or feeder, and in order to properly present the material to the slot each feeder or carrier is in the form of an endless belt or band composed of slats $D'$, which are connected to the links D of feed or sprocket chains, said chains operating over suitable sprockets, and the carrier is arranged to operate in an inclined position. To this end the endless carrier belt or band is arranged to operate over sprocket-wheels $b'$ and $c'$, respectively, mounted upon inclined shafts $b$ and $c$, suitably journaled in bearings B and C, respectively.

I will now describe means for actuating the carrier, it being understood that it is desirable to provide a driving mechanism for said carrier which may be readily regulated and adjusted as to the speed of travel thereof in order that the material to be fed may be properly presented to the compressing apparatus.

Figure 7:
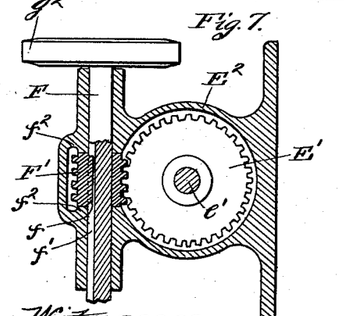
Fig. 7 is an enlarged detail broken view in section of a friction drive-wheel for regulating the speed of travel of the feed carrier or apron.
Figure 8:
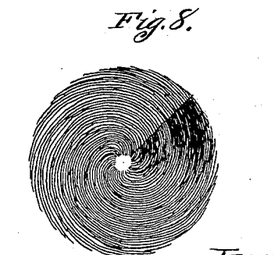
Fig. 8 is a plan or end view of a bale, illustrating the manner in which the material is built up into bale form.

Reference-sign $e'$ designates a shaft suitably journaled in bearings $e^2$ in the frame A. This shaft is geared to shaft $b$ by means of the gears $e$ E, respectively, carried by said shafts $e'$ and $b$. Upon shaft $e'$ is keyed a gear $E'$, arranged to intermesh with and to drive a worm $F'$, said worm being mounted upon a shaft F and provided with a feather $f$, engaging in a groove $f'$ in said shaft F. The shaft F is journaled in a casing $E^2$, which may also be utilized to form an inclosing casing or housing for gear $E'$, and the worm-block $F'$ may be held against endwise movement by means of the shoulders $f^2$. (See Fig. 7). By this construction it will be seen that shaft F may be moved longitudinally through work-block $F'$, and by reason of the feather-and-groove engagement between said worm-block and shaft said shaft will be rotated when the worm-block is actuated, while permitting of the longitudinal movement of said shaft. In suitable journals $g$, carried by frame A, is journaled a shaft G, upon which is mounted a friction-gear $g'$, arranged to engage a similar gear $g^2$, carried by a shaft F. Rotation may be imparted to shaft G in any suitable manner—as, for instance, by means of a belt $h$, operating over pulleys $g^3$ $h^3$, respectively, carried by said shaft G, and a power-shaft H, the latter receiving rotation from any suitable or convenient source.

Figures 2, 9:
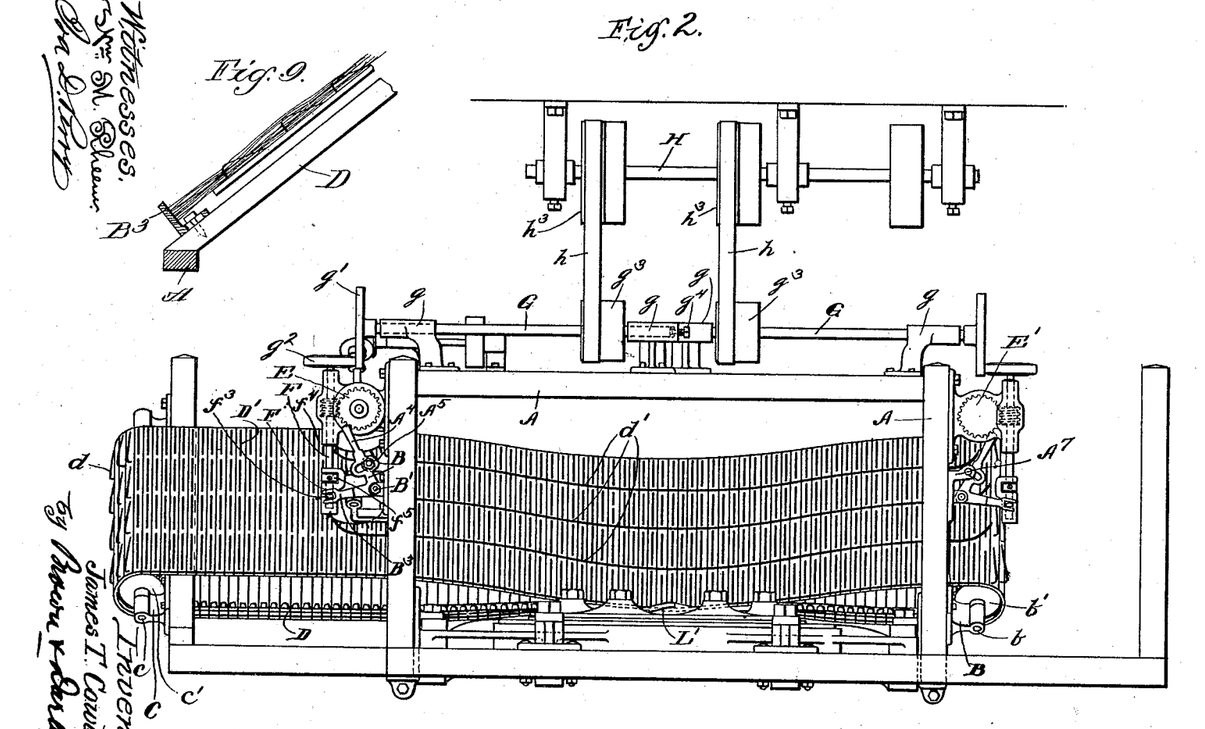
Fig. 2 is a side elevation of the same, one of the carriers or feeders being omitted.
Fig. 9 is a detail section on the line 9 9, Fig. 1.
Figure 3:
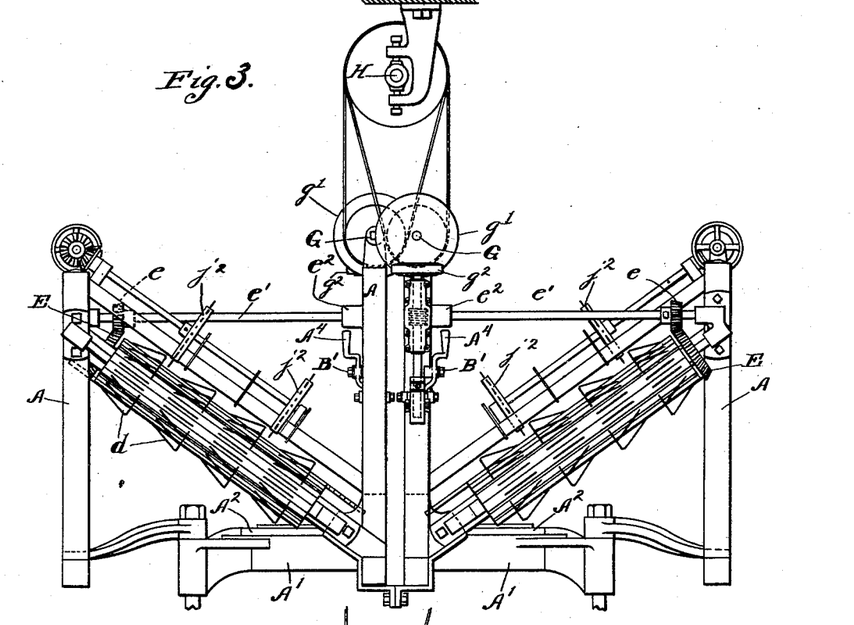
Fig. 3 is an end view looking from the left of Fig. 2.
Figure 4:
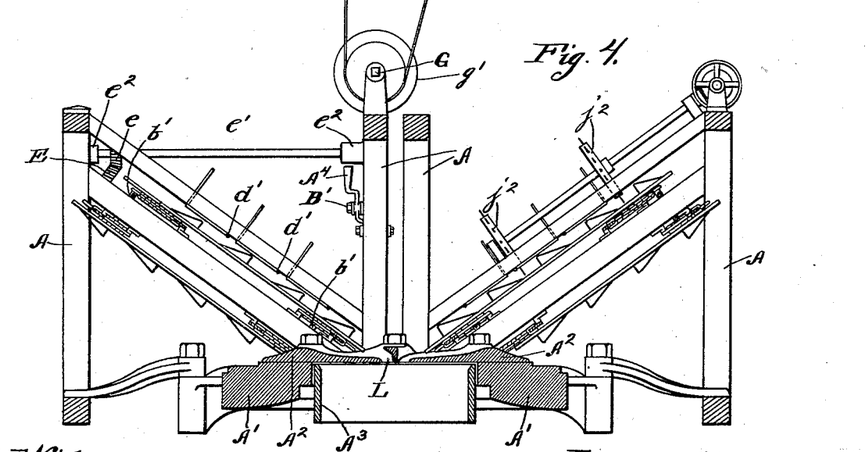
Fig. 4 is a vertical transverse section on the line 4 4 of Fig. 1 looking in the direction of the arrows.

From the foregoing description it will be seen that the feed-carrier is actuated through a drive-gear, the speed of which may be readily adjusted by shifting the position of gear $g^2$ with reference to its drive-gear $g'$. An efficient engagement between said gears $g'$ $g^2$ may be secured in any suitable manner—as, for instance, by adjusting shaft G longitudinally. This longitudinal adjustment of said shaft may be secured by means of a set-screw $g^4$, arranged to engage the end of said shaft. (See Fig. 2.) The shaft F is engaged by or stepped in a socket F', having a lug $f^4$, arranged to engage a collar $f^5$, secured to shaft F. Pivoted in convenient relation upon a standard or other convenient part of frame A, as at B', is a bell-crank lever $B^2$, the arm $B^3$ of which being formed into a yoke and arranged to engage lugs or projections $f^3$, formed on or carried by socket F'. The arm $A^4$ of the bell-crank lever is formed into a handle. The handle $A^4$ may be held in any desired position by means of a bolt $A^6$, said bolt passing through a slotted enlargement $A^5$ of said lever and carried by a lug or bracket $A^7$, which is secured to the standard of the frame A. Of course it will be understood that any other convenient construction may be employed for holding the lever $A^4$ in adjusted position.

From the foregoing description it will be seen that when it is desired to increase or decrease the speed of the feeder carrier or apron it is only necessary to manipulate lever $A^4$ until the friction-wheel $g^2$ is adjusted the proper distance from the center of the friction-wheel $g'$, and when the desired speed is secured the bolt $A^6$ is tightened to hold the friction-wheel $g^2$ in its adjusted position.

Figure 5:
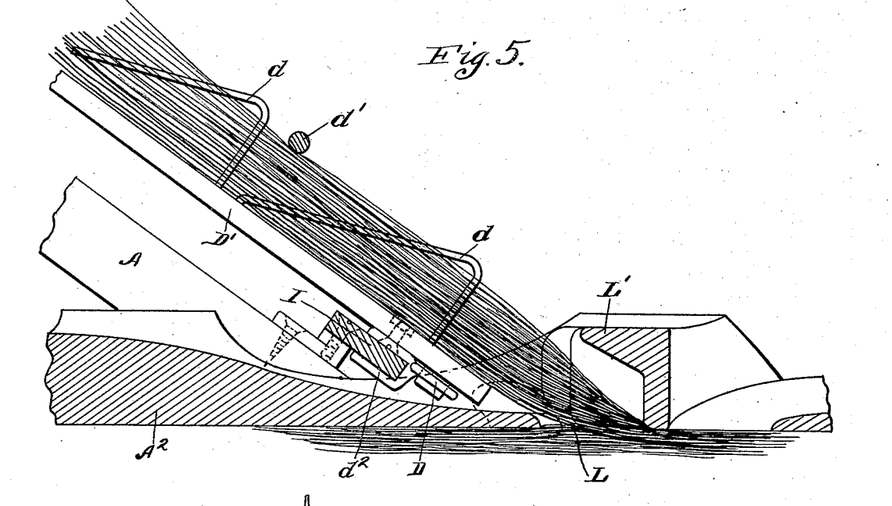
Fig. 5 is an enlarged detail broken view, in vertical transverse section, showing the head-plate and a portion of the feeding-apron and the material being fed through the slot in the head-plate.
Figure 6:
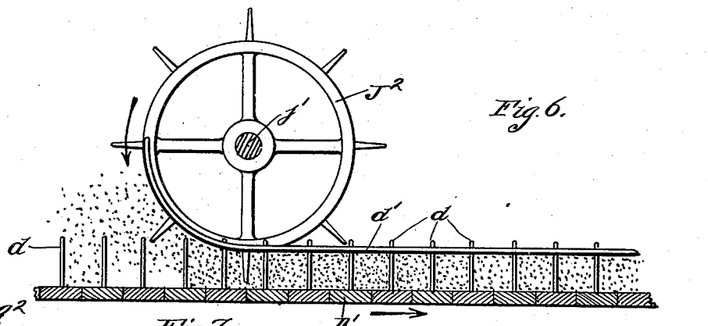
Fig. 6 is a broken detail view in section of the feeder or carrier and a presser-foot and feeder-wheel.

In order to efficiently engage and present the material, I provide the slats D' of the apron or carrier with engaging projections $d$. These projections are preferably formed of round wire and are bent into angular relation, as clearly shown in Fig. 5—that is, one end of said wire is secured to the slat, and intermediate its end the wire is bent in the direction of length of the slat, so as to form a triangular-shaped stop, with the polished point thereof presented in the direction of pull exerted upon the material when drawn into the compressing apparatus. The object of this arrangement is to reduce the resistance offered to the pull of the material into the compressing apparatus in case the material should become engaged around the stops or projections, such pull upon the material causing the same to ride up the incline of the stops and pass over the same.

In order to aid in holding the material down upon the apron or carrier, I may employ a series of presser-feet $d'$, suitably supported upon the frame A of the machine and extending longitudinally with respect to the carrier. These presser-feet may be of any suitable construction or arrangement; but preferably I employ heavy round wire for this purpose, said presser-feet coöperating with the projections $d$ to efficiently hold the material in place upon the carrier or apron.

It is desirable that the material presented to the machine should be carried in as close proximity to the edge of the slots as possible in order to enable the material to be engaged in the slot of the cap or head-plate. In order to secure this result, and at the same time to enable the carrier or apron to clear the head-plate or cap in its return leg or portion, the links of the chain D are provided with a grooved casting $d^2$ or other suitable engaging device arranged to be engaged and guided by or to slide upon a track I. (See Fig. 5.) This track is stationarily mounted upon frame A and is so shaped that it will guide the apron down close to the slots at the center of the head-plate and to carry the return portion of the carrier out of interfering position with respect to the other parts of the head-plate and its supporting-ring. In this manner the material is brought down into close relation with respect to the feed-slots of the head-plate.

Associated with the carrier or apron and coöperating with the pins or projections $d$ and presser-feet $d'$ and aiding in the feed and presentation of the material to be baled are two wheels $J^2$. These wheels are mounted upon a shaft J', journaled in suitable bearings J, carried by frame A and rotated in any suitable manner, as by means of gears $J^3$ and K, the latter being carried upon a shaft K', suitably journaled in frame A and driven through pulley $K^2$ from any convenient source.

As above explained, the feed of the material into the compression-chamber may be started at or near the center of the head-plate and the progressive feed be effected from that point outwardly or toward the periphery of the head-plate. In such event the slot L should be wider at or near the center thereof than at its outer end and should be provided with an overhanging lip L', said lips being so constructed at or near the center as to permit an easy entrance of the ends of the material into the slot, thereby insuring a rapid and substantial engagement or gripping action with the mass of material previously introduced or between the surface of the previously-introduced mass and the coöperating surface of the lip of the slot. It is obvious, however, that the feed of the material may be from the outer end of the slot toward the center, this result being accomplished by reversing the direction of feed of the aprons or carriers and by making the outer end of the slot wider than the inner end thereof, the overhanging lip L' being so shaped as to permit the ready and easy entrance of the material at the outer end of the slot.

In the foregoing description I have set forth the construction and arrangement associated with only one feed-slot in the head-plate. It is obvious, however, that the head-plate may be provided with two or more feed-slots, and I have shown a construction wherein the head-plate is provided with two feed-slots, and I have shown the associated parts of the feeding apparatus for two slots, the mechanism being merely duplicated for as many slots as may be desired.

Figure 1:
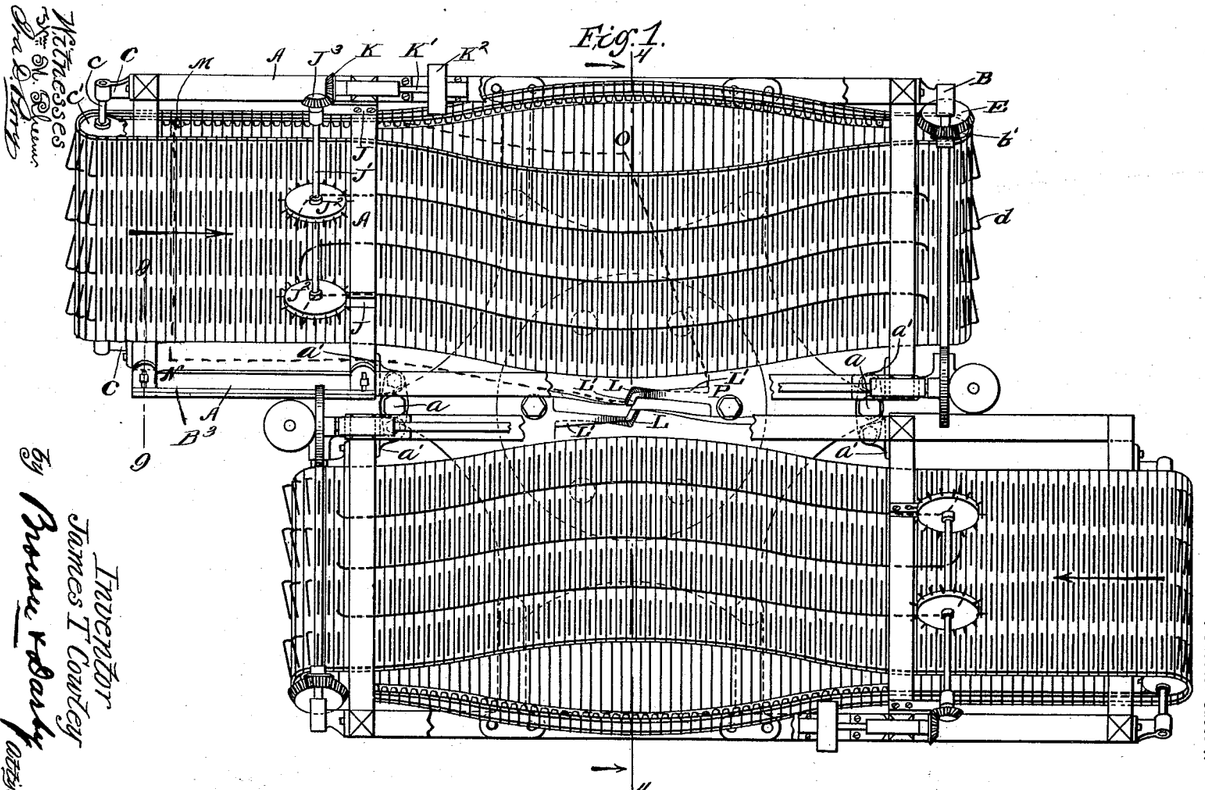
Figure 1 is a plan view of a compressing apparatus, showing the application thereto of a feeder attachment embodying my invention.

The operation is as follows: It will be understood that relative movement is imparted to the head-plate and compression-chamber in the usual manner, as set forth in the patent to Lowry, above referred to. The material to be compressed is placed upon the carrier for each slot at about the points indicated by the arrows in Fig. 1, said material being previously arranged as nearly as possible in substantially parallel relation. The carriers are then actuated in the direction indicated by said arrows, the material being engaged by the projections $d$ and through the head of the presser-feet $d'$ and the toothed wheels $J^2$ aiding in pressing the material down into efficient engaging relation with respect to the projections $d$ of the carriers. The carriers then present the material in proper relation to the feed-slots by means of the cam-track I. The position occupied by the material during the feeding and presentation thereof to the compressing apparatus is indicated by the dotted line M N P O, the material occupying full-length position at the point O, directly opposite the entrance of the material into the slot L, and as the material travels or is carried on to the end of the slot L it is drawn into the compressing-chamber through the slot, the feed of the carrier or apron being so regulated that the full length of the material will be drawn into the slot during its travel from one end of the slot to the other, so that a stem, stalk, strand, or fiber which enters at one end of the slot will be fully drawn into the chamber by the time the feed of the carrier has progressed to the opposite end of the slot. By arranging the carriers to operate in planes inclined relative to the head-plates the material will be properly presented to the slots, to be drawn longitudinally into the compressing-chamber and transversely of the line of movement of the carrier.

It may sometimes be desirable to adjustably regulate the extent of projection of the ends of the material beyond the lower edge of the carrier. This result may be accomplished by providing an adjustable gage $B^3$, against which the ends of the material may abut, as clearly shown in Figs. 1 and 9.

It is obvious that many variations in the details of construction and arrangement would readily occur to persons skilled in the art and still fall within the spirit and scope of my invention. I do not desire, therefore, to be limited or restricted to the exact details shown and described; but, Having now set forth the object and nature of my invention and a construction embodying the principles thereof, what I claim as new and useful and of my own invention, and desire to secure by Letters Patent of the United States, is—

1. In an apparatus for baling fibrous material, the combination with compressing apparatus, of a feeding mechanism arranged to receive the material transversely thereon, said mechanism operating past said compressing apparatus, and arranged to convey the material into position to be received longitudinally into said compressing mechanism, whereby such material is drawn into the compressing mechanism transversely of the line of feed thereof, as and for the purpose set forth.

2. In an apparatus for baling fibrous or other materials, the combination with compressing mechanism adapted to receive and compress the material to be baled, of a carrier upon which the material is placed transversely with respect to the line of feed of the carrier, said carrier arranged to travel in a path past such compressing mechanism to feed the material thereto, whereby the material is presented in position to be drawn longitudinally into the compressing apparatus transverse with respect to the line of movement of said carrier, as and for the purpose set forth.

3. In an apparatus for baling fibrous or other materials, the combination with compressing apparatus, of a carrier for the material to be baled, the material occupying a position on said carrier transverse to the line of feed thereof, said carrier operating to present the material into position to be drawn longitudinally into the compressing mechanism, and said carrier being inclined relative to the compressing apparatus and arranged to operate past the same whereby the material is drawn longitudinally into the compressing apparatus, as and for the purpose set forth.

4. In an apparatus for compressing and baling fibrous material, the combination with compressing mechanism adapted to engage and draw longitudinally the material to be compressed and baled therein, and means for feeding the material past the compressing mechanism and in a line transverse with respect to the drawing action exerted by the compressing mechanism, as and for the purpose set forth.

5. In an apparatus for baling and compressing fibrous material, the combination with the compressing mechanism adapted to receive and draw longitudinally therein the material to be compressed and baled, and means for feeding the material transversely with respect to the line of draw of the compressing apparatus and in inclined relation, as and for the purpose set forth.

6. In an apparatus for baling and compressing fibrous material, a compressing apparatus including a compression-chamber and a slotted head-plate, in combination with means for feeding the material to be compressed lengthwise with respect to the slot in said head-plate, whereby the material is drawn into the compression-chamber in layers, the fibers, stems, stalks, strands or the like, thereof, being in parallel relation with each other in each layer, as and for the purpose set forth.

7. In an apparatus for compressing and baling fibrous material, the combination with compressing apparatus including a compression-chamber and a slotted cap-plate, the material to be compressed adapted to be drawn through the slot in said cap to effect the baling and compressing operation, and means for moving the material lengthwise of said slot during the baling operation, as and for the purpose set forth.

8. In an apparatus for compressing and baling fibrous material, the combination with a compressing apparatus including a relatively movable slotted head-plate and compression-chamber, the material to be compressed adapted to be introduced, lengthwise of the fiber thereof, to the compression-chamber through said slot, and means for progressively moving the material lengthwise of such slot during the baling operation, as and for the purpose set forth.

9. In an apparatus for compressing and baling fibrous material, a compression-chamber, means for condensing the material in superposed layers within said chamber and correspondingly advancing the compressed material through the same, and means for imparting to the material a feeding movement in a radial direction relative to the compressed mass within the chamber during the condensing and compressing operation, whereby the fibers, stems, stalks or the like, of the material, will have one of the ends thereof terminating at or near the center of the compressed mass, and the other end terminating at or near the periphery of the mass, as and for the purpose set forth.

10. In an apparatus for baling fibrous or other material having long stems, stalks or fibers, the combination with a compressing apparatus operating upon such stems, stalks or fibers, to draw the same longitudinally therein, and means for progressively feeding said stems, stalks or fibers, transverse with respect to the drawing action of the compressing mechanism, as and for the purpose set forth.

11. In an apparatus for compressing and baling fibrous material, the combination with a compressing mechanism including a compression-chamber and a slotted head-plate, of a feeding mechanism for the material to be compressed, said feeding mechanism operating to convey the material in a direction lengthwise of the slot in the head-plate, as and for the purpose set forth.

12. In an apparatus for compressing and baling fibrous material, a compressing mechanism including a compression-chamber and a slotted head-plate, in combination with a carrier arranged to operate in a line parallel with the slot in the head-plate, and operating to progressively move the material lengthwise of said slot, as and for the purpose set forth.

13. In an apparatus for compressing and baling fibrous material, a compressing apparatus including a relatively movable compression-chamber and a slotted head-plate therefor, in combination with a carrier-belt arranged in inclined relation with respect to said head-plate, and operating to convey the material lengthwise of the slot in said head-plate, as and for the purpose set forth.

14. In an apparatus for compressing and baling fibrous material, compressing mechanism including a slotted cap and a compression-chamber, a feed-carrier for the material to be compressed, said carrier operating to feed the material in the direction of the length of the slot in the cap, and means for guiding said carrier into close proximity to the slot, as and for the purpose set forth.

15. In an apparatus for compressing and baling fibrous material, a compressing apparatus including a slotted head-plate and a compression-chamber, a carrier arranged to operate lengthwise with respect to the slot in the head-plate, and a cam-track arranged to guide the carrier into close proximity to the slot, as and for the purpose set forth.

16. In an apparatus for compressing and baling fibrous material, a compressing mechanism, in combination with feeding devices for the material to be compressed and baled, said feeding mechanism operating alongside of and past the compressing mechanism, operating-gearing for said feeding mechanism, and means for controlling said feed mechanism to vary the speed thereof, as and for the purpose set forth.

17. In an apparatus for compressing and baling fibrous material, a compressing apparatus including a slotted head-plate and a compression-chamber, shafts arranged in inclined relation with respect to the plane of said head-plate, an endless carrier operating over said shafts, said carrier operating in the direction of the length of the slot in said head-plate, driving mechanism for one of said shafts, and means for varying the speed of action of said driving mechanism, as and for the purpose set forth.

18. In an apparatus for compressing and baling fibrous material, a compressing apparatus including a slotted head-plate and a compression-chamber, shafts arranged in inclined relation with respect to the plane of said head-plate, an endless carrier operating over said shafts, said carrier operating in the direction of the length of the slot in said head-plate, means for actuating said carrier, and means for guiding the edge of said carrier into close proximity with respect to the slot in the head-plate, as and for the purpose set forth.

19. In an apparatus for compressing and baling fibrous material, a compressing mechanism, in combination with a feeding mechanism for presenting the material to such compressing mechanism, said feeding mechanism operating alongside of and past said compressing mechanism, whereby the material is moved transversely to the drawing action of said compressing mechanism, a friction drive-gearing for said feeding mechanism, and means for adjustably regulating the speed of action of said friction drive-gearing, as and for the purpose set forth.

20. In an apparatus for compressing and baling fibrous material, a compressing mechanism including a slotted head-plate and a compression-chamber, in combination with a carrier operating past the compressing mechanism to move the material lengthwise of the slot in said head-plate for presenting the material to be compressed and baled to the action of such compressing mechanism, means for actuating said feeding mechanism including engaging friction-disks, and means for shifting said friction-disks relatively to each other to vary the speed of said feeding mechanism, as and for the purpose set forth.

21. In an apparatus for compressing and baling fibrous material, a compressing mechanism including a slotted cap or head plate and a compression-chamber, a carrier-belt arranged to move in a line parallel with the slot in said cap or head plate for presenting the material to the action of said compressing mechanism, drive-gearing for said feeding mechanism including engaging friction-disks, a bell-crank lever arranged to move one of said disks relatively to the other, and means for locking said lever in adjusted position, as and for the purpose set forth.

22. In an apparatus for compressing and baling fibrous material, the combination with compressing mechanism, of a feeding-carrier for presenting the material to be compressed to said compressing mechanism, said carrier operating past said compressing mechanism, and having inclined projections arranged to engage the material, and means for actuating said carrier, as and for the purpose set forth.

23. In an apparatus for compressing and baling fibrous material, a compressing mechanism, in combination with a feed-carrier for presenting the material to be compressed to said compressing mechanism, said carrier operating past said compressing mechanism and provided with inclined projections arranged to engage the material, said projections being inclined in a direction away from the compressing mechanism, as and for the purpose set forth.

24. In an apparatus for compressing and baling fibrous material, a compressing mechanism, in combination with a carrier adapted to receive the material in transverse relation with respect to the line of feed thereof, and having projections arranged to engage the material, and presser-feet arranged to coöperate with said projections to efficiently maintain the material in engagement in proper relation with respect to the carrier, said carrier operating past the compressing apparatus and means for actuating said carrier, as and for the purpose set forth.

25. In an apparatus for compressing and baling fibrous material, a compressing mechanism, in combination with a carrier arranged to operate in a line alongside of and past said compressing mechanism, and having projections arranged to engage the material to be compressed, and rotary wheels having pins and operating above said carrier to press the material into efficient engagement with the projections on the carrier, and means for actuating said carrier and disks, as and for the purpose set forth.

26. In an apparatus for compressing and baling fibrous material, compressing mechanism, in combination with a carrier arranged to operate alongside of and past said compressing mechanism, and having projections, stationary presser-feet arranged above said carrier, and disks or wheels having pins arranged to coöperate with the projections of said carrier and said presser-feet to establish efficient engagement of the carrier with the material to be fed, as and for the purpose set forth.

27. In an apparatus for compressing and baling fibrous material, a compressing apparatus including a compression-chamber and a slotted head-plate, the slot in said head-plate having an overhanging lip, as and for the purpose set forth.

28. In an apparatus for baling and compressing fibrous material, a compressing apparatus including a compression-chamber and a slotted head-plate, the slot in said head-plate being wider at one end than at the other, as and for the purpose set forth.

29. In an apparatus for compressing and baling fibrous material, a compressing apparatus including a compression-chamber and a slotted head-plate, the slot in said head-plate extending in a radial direction and having an overhanging lip, and means for progressively moving the material to be compressed lengthwise with respect to said slot while such material is being drawn through said slot, as and for the purpose set forth.

30. In an apparatus for compressing and baling fibrous material, a compressing apparatus including a compression-chamber and a slotted head-plate, the slot in said head-plate extending from the center to the periphery thereof, and means for progressively moving or feeding the material from the inner toward the outer end of said slot during the operation of said compressing mechanism, as and for the purpose set forth.

31. In an apparatus for compressing and baling fibrous material, a compressing apparatus including a compression-chamber and a slotted head-plate, a stationary support for said head-plate, a frame mounted upon said stationary support, a carrier mounted on said frame and operating to feed the material in the direction of the length of the slot in said head-plate during the operation of said compressing mechanism, and means for actuating said carrier, as and for the purpose set forth.

32. In an apparatus for compressing and baling fibrous material, a compressing mechanism including a compression-chamber and a head-plate, said head-plate provided with a plurality of slots therethrough, and a feeding device for each slot, each feeding device operating in the direction of the length of its corresponding slot, as and for the purpose set forth.

33. In an apparatus for compressing and baling fibrous material, a compressing mechanism, and a carrier for presenting the material to be compressed thereto, in combination with a driving-gearing for said feeding mechanism, said driving-gearing including a worm-block, a shaft arranged to be rotated by said worm-block but capable of longitudinal movement therethrough, gearing actuated by said worm-block for driving said feeding mechanism, and means actuated by the longitudinal movement of said shaft for varying the speed of rotation thereof, as and for the purpose set forth.

34. In an apparatus for baling fibrous or other material, the combination with compressing apparatus, of a carrier for the material to be baled, said carrier arranged to operate alongside of and past said compressing apparatus, and means for regulating the projection of the material beyond the carrier, as and for the purpose set forth.

35. In an apparatus for baling fibrous or other material, the combination with compressing mechanism, of a carrier, and means for actuating the same to present the material to the compressing mechanism and an adjustable stop arranged adjacent to the line of travel of the carrier to regulate the position of the material on said carrier, as and for the purpose set forth.

36. In an apparatus for compressing and baling fibrous material, the combination with compressing mechanism adapted to engage and draw the material to be compressed and baled therein, a carrier for feeding the material transversely with respect to the drawing action exerted by the compressing mechanism, and an adjustable stop arranged adjacent to the line of travel of the carrier for regulating the position of the material upon said carrier, as and for the purpose set forth.

37. In an apparatus for compressing and baling fibrous material, a compressing mechanism and a feed-carrier therefor, in combination with a housing, a worm-gear mounted in said housing, gearing actuated thereby for driving said feed-carrier, a shaft upon which said worm-gear is mounted, said shaft being splined to rotate with said worm-gear but capable of longitudinal movement therethrough, means for adjustably projecting said shaft through said worm-gear, a friction-disk mounted upon said shaft, and a coöperating driving friction-disk, all combined and arranged as and for the purpose set forth.

In witness whereof I have hereunto set my hand, this 22d day of November, 1900, in the presence of the subscribing witnesses.

JAMES T. COWLEY.

Witnesses:
  N. LEE JOHNSON,
  WM. M. RHEEM.